US009497254B2

(12) United States Patent
Ke

(10) Patent No.: US 9,497,254 B2
(45) Date of Patent: Nov. 15, 2016

(54) COMMUNICATION METHOD, COMMUNICATION APPARATUS AND ELECTRONIC DEVICE

(75) Inventor: Haibin Ke, Beijing (CN)

(73) Assignees: LENOVO (BEIJING) LIMITED, Beijing (CN); Beijing Lenovo Software Ltd., Beijing (CN)

( * ) Notice: Subject to any disclaimer, the term of this patent is extended or adjusted under 35 U.S.C. 154(b) by 315 days.

(21) Appl. No.: 14/342,619

(22) PCT Filed: Aug. 23, 2012

(86) PCT No.: PCT/CN2012/080491
§ 371 (c)(1),
(2), (4) Date: Mar. 4, 2014

(87) PCT Pub. No.: WO2013/063972
PCT Pub. Date: May 10, 2013

(65) Prior Publication Data
US 2014/0215016 A1 Jul. 31, 2014

(30) Foreign Application Priority Data
Oct. 31, 2011 (CN) .......................... 2011 1 0338016

(51) Int. Cl.
G06F 15/16 (2006.01)
H04L 29/08 (2006.01)
G06F 3/00 (2006.01)
(52) U.S. Cl.
CPC ................. H04L 67/02 (2013.01); G06F 3/00 (2013.01)
(58) Field of Classification Search
CPC ................................... G06F 3/00; H04L 67/02
USPC ....................................................... 709/217
See application file for complete search history.

(56) References Cited

U.S. PATENT DOCUMENTS 6,182,122 B1 * 1/2001 Berstis .............. G06F 17/30902
707/E17.12
6,388,988 B1 5/2002 Jabbarnezhad
(Continued)

FOREIGN PATENT DOCUMENTS

CN 1760842 A 4/2006
CN 1842076 A 10/2006
(Continued)

OTHER PUBLICATIONS

International Search Report for corresponding International Application No. PCT/CN2012/080491, mailed Dec. 6, 2012 (4 pages).
(Continued)

Primary Examiner — Vivek Srivastava
Assistant Examiner — Normin Abedin
(74) Attorney, Agent, or Firm — Osha • Liang LLP

(57) ABSTRACT

The present invention discloses a communication method, a communication apparatus, and an electronic device. The communication method is used in a hybrid architecture system comprising a first terminal and a second terminal, the first terminal comprising a first hardware system, the second terminal comprising a second hardware system, there being a first data channel and a second data channel between the first hardware system and the second hardware system, the communication method comprising: obtaining data to be transmitted which are to be transmitted from the first hardware system to the second hardware system; obtaining a channel selection parameter; selecting at least one data channel from the first data channel and the second data channel according to the channel selection parameter; and transmitting the data to be transmitted from the first hardware system to the second hardware system via the selected at least one data channel. The present invention improves flexibility of data transmission.

13 Claims, 5 Drawing Sheets

(56) References Cited

U.S. PATENT DOCUMENTS

| | | | |
|---|---|---|---|
| 6,631,474 B1* | 10/2003 | Cai | G06F 1/3203 |
| | | | 713/300 |
| 2005/0180432 A1 | 8/2005 | Hirai | |
| 2007/0082604 A1* | 4/2007 | Rueckriem | H04H 20/22 |
| | | | 455/3.04 |
| 2007/0218938 A1* | 9/2007 | Carter | H04W 52/0251 |
| | | | 455/528 |
| 2009/0052322 A1* | 2/2009 | Simonsson | H04W 28/20 |
| | | | 370/235 |
| 2010/0142368 A1* | 6/2010 | Gunukula | H04J 3/14 |
| | | | 370/217 |
| 2011/0213992 A1* | 9/2011 | Satsangi | G06F 1/3209 |
| | | | 713/300 |

FOREIGN PATENT DOCUMENTS

| | | |
|---|---|---|
| CN | 101661321 A | 3/2010 |
| CN | 101847043 A | 9/2010 |

OTHER PUBLICATIONS

Written Opinion for corresponding International Application No. PCT/CN2012/080491, mailed Dec. 6, 2012 (4 pages).

* cited by examiner

COMMUNICATION METHOD, COMMUNICATION APPARATUS AND ELECTRONIC DEVICE

TECHNICAL FIELD

The present invention relates to the field of electronics, and particularly to a communication method, a communication apparatus and an electronic device.

BACKGROUND

In a Hybrid computer system, data synchronization between sub-systems may be frequently required. Besides synchronization of user data (e.g. pictures, music, movies etc.), some system data (e.g. battery information, system states of both sides etc.) also need to be synchronized.

There are some Hybrid architecture systems in the prior art that include different sub-systems. However, different sub-systems may share one and the same set of peripherals (such as a screen, a keyboard, a mouse, etc.)

Normally, a user will only operate one of sets of sub-systems, while the other sets of sub-systems may run in background. Furthermore, in order to save power, a background sub-system is generally in a standby state. In this case, if a sub-system running in frontend needs to interact with the background sub-system, the background sub-system is required to be woken up so as to complete synchronization of data. Such means for data interaction between the two sub-systems lack flexibility.

SUMMARY OF INVENTION

An object of an embodiment of the present invention is to provide a communication method, a communication apparatus and an electronic device for improving flexibility of the Hybrid architecture system in data interaction performed between sub-systems.

In order to achieve the above object, an embodiment of the present invention provides a communication method for use in a hybrid architecture system comprising a first terminal and a second terminal, the first terminal comprising a first hardware system, the second terminal comprising a second hardware system, there being a first data channel and a second data channel between the first hardware system and the second hardware system, the communication method comprising:

obtaining data to be transmitted which are to be transmitted from the first hardware system to the second hardware system;

obtaining a channel selection parameter;

selecting at least one data channel from the first data channel and the second data channel according to the channel selection parameter; and transmitting the data to be transmitted from the first hardware system to the second hardware system via the selected at least one data channel.

In the above communication method, the second data channel is in an operating state for a long term; the first data channel is in the operating state or a non-operating state according to hardware states of the first hardware system and the second hardware system; the first data channel and/or the second data channel, when it is in the operating state, can be used for transmitting data between the first hardware system and the second hardware system; and the first data channel cannot be used for transmitting data between the first hardware system and the second hardware system when it is in the non-operating state.

In the above communication method, the channel selection parameter is a state parameter of the first data channel, and selecting at least one data channel from the first data channel and the second data channel according to the channel selection parameter comprises selecting at least the first data channel if the state parameter of the first data channel indicates that the first data channel is in the operating state.

In the above communication method, the channel selection parameter is data amount of the data to be transmitted, and selecting at least one data channel from the first data channel and the second data channel according to the channel selection parameter comprises: selecting the first data channel if the data amount of the data to be transmitted is above a preset data amount threshold; otherwise, selecting the second data channel.

In the above communication method, the data to be transmitted are data pre-cached by the first hardware system into a first cache of the first hardware system, and the method further comprises, prior to obtaining the data to be transmitted:

receiving, from the second hardware system, a data request for the data to be transmitted.

In the above communication method, the data to be transmitted are data to be transmitted to a second main processor of the second hardware system, and the communication method further comprises:

determining whether the second main processor is in a sleeping state after the data to be transmitted are transmitted from the first hardware system to the second hardware system;

caching the data to be transmitted into a cache of the second hardware system if the second main processor is in the sleeping state; and transmitting the cached data to be transmitted to the second main processor after the second main processor is woken up from the sleeping state.

In the above communication method, the data to be transmitted are data to be transmitted to the second main processor of the second hardware system, and the communication method further comprises:

determining the current state of the second main processor after the data to be transmitted are transmitted from the first hardware system to the second hardware system;

transmitting the data to be transmitted to the second main processor if the second main processor is in an activated state; otherwise, determining whether the data to be transmitted need to be transmitted to the second main processor immediately; and waking up the second main processor and transmitting the data to be transmitted to the second main processor if the data to be transmitted need to be transmitted to the second main processor immediately; otherwise, caching the data to be transmitted into the cache of the second hardware system, and transmitting the cached data to be transmitted to the second main processor when the second main processor is woken up and in the activated state.

In the above communication method, power consumption for maintaining the first data channel in the operating state is larger than that for maintaining the second data channel in the operating state.

In the above communication method, the data to be transmitted are battery state data or a battery state query instruction.

In order to achieve the above object, an embodiment of the present invention further provides a communication apparatus for use in a hybrid architecture system comprising a first terminal and a second terminal, the first terminal comprising a first hardware system, the second terminal comprising a second hardware system, there being a first data channel and a second data channel between the first hardware system and the second hardware system, the communication apparatus comprising:

a first obtaining module configured to obtain data to be transmitted which are to be transmitted from the first hardware system to the second hardware system;

a second obtaining module configured to obtain a channel selection parameter, a selection module configured to select at least one data channel from the first data channel and the second data channel according to the channel selection parameter, and a transmission module configured to transmit the data to be transmitted from the first hardware system to the second hardware system via the selected at least one data channel.

In the above communication apparatus, the second data channel is in an operating state for a long term; the first data channel is in an operating state or a non-operating state according to hardware states of the first hardware system and the second hardware system; the first data channel and/or the second data channel, when it is in the operating state, can be used for transmitting data between the first hardware system and the second hardware system; and the first data channel cannot be used for transmitting data between the first hardware system and the second hardware system when it is in the non-operating state.

In the above communication apparatus, the channel selection parameter is a state parameter of the first data channel, and when the state parameter of the first data channel indicates that the first data channel is in the operating state, the selection module is further configured to select at least the first data channel.

In the above communication apparatus, the channel selection parameter is data amount of the data to be transmitted, and the selection module is further configured to select the first data channel if the data amount of the data to be transmitted is above a preset data amount threshold; otherwise, select the second data channel.

In the above communication apparatus, the data to be transmitted are data pre-cached by the first hardware system into a first cache of the first hardware system, and the communication apparatus further comprises:

a reception module configured to receive, from the second hardware system, a data request for the data to be transmitted.

The first obtaining module is further configured to obtain the data to be transmitted upon the reception module receives the request.

In the above communication apparatus, the data to be transmitted are data to be transmitted to a second main processor of the second hardware system, and the communication apparatus further comprises:

a first determination module configured to determine whether the second main processor is in a sleeping state after the data to be transmitted are transmitted from the first hardware system to the second hardware system;

a first caching module configured to cache the data to be transmitted into a cache of the second hardware system if the second main processor is in the sleeping state; and a first transmission module configured to transmit the cached data to be transmitted to the second main processor after the second main processor is woken up from the sleeping state.

In the above communication apparatus, the data to be transmitted are data to be transmitted to the second main processor of the second hardware system, and the communication apparatus further comprises:

a second determination module configured to determine the current state of the second main processor after the data to be transmitted are transmitted from the first hardware system to the second hardware system;

a third determination module configured to transmit the data to be transmitted to the second main processor if the second main processor is in an activated state; otherwise, determine whether the data to be transmitted need to be transmitted to the second main processor immediately; and a second transmission module configured to wake up the second main processor and transmit the data to be transmitted to the second main processor if the data to be transmitted need to be transmitted to the second main processor immediately; otherwise, cache the data to be transmitted into a cache of the second hardware system, and transmit the cached data to be transmitted to the second main processor when the second main processor is woken up and in the activated state.

In the above communication apparatus, power consumption for maintaining the first data channel in the operating state is larger than that for maintaining the second data channel in the operating state.

In the above communication apparatus, the data to be transmitted are battery state data or a battery state query instruction.

In order to achieve the above object, an embodiment of the present invention further provides an electronic device comprising a first terminal and a second terminal, the first terminal comprising a first hardware system, the second terminal comprising a second hardware system, there being a first data channel and a second data channel between the first hardware system and the second hardware system, the electronic device further comprising:

a first obtaining module configured to obtain data to be transmitted which are to be transmitted from the first hardware system to the second hardware system;

a second obtaining module configured to obtain a channel selection parameter;

a selection module configured to select at least one data channel from the first data channel and the second data channel according to the channel selection parameter; and a transmission module configured to transmit the data to be transmitted from the first hardware system to the second hardware system via the selected at least one data channel.

Embodiments of the present invention have beneficial effects as follows.

In the communication method according to the embodiment of the present invention, a plurality of data channels are established between two hardware systems. During data transmission, a data channel may be selected in real time according to a channel selection parameter, and data transmission may be performed using the selected data channel. With the method according to the embodiment of the present invention, either one data channel or two data channels may be selected according to different requirements, which may improve flexibility of data transmission between the hardware systems.

DETAILED DESCRIPTION

Figure 1:
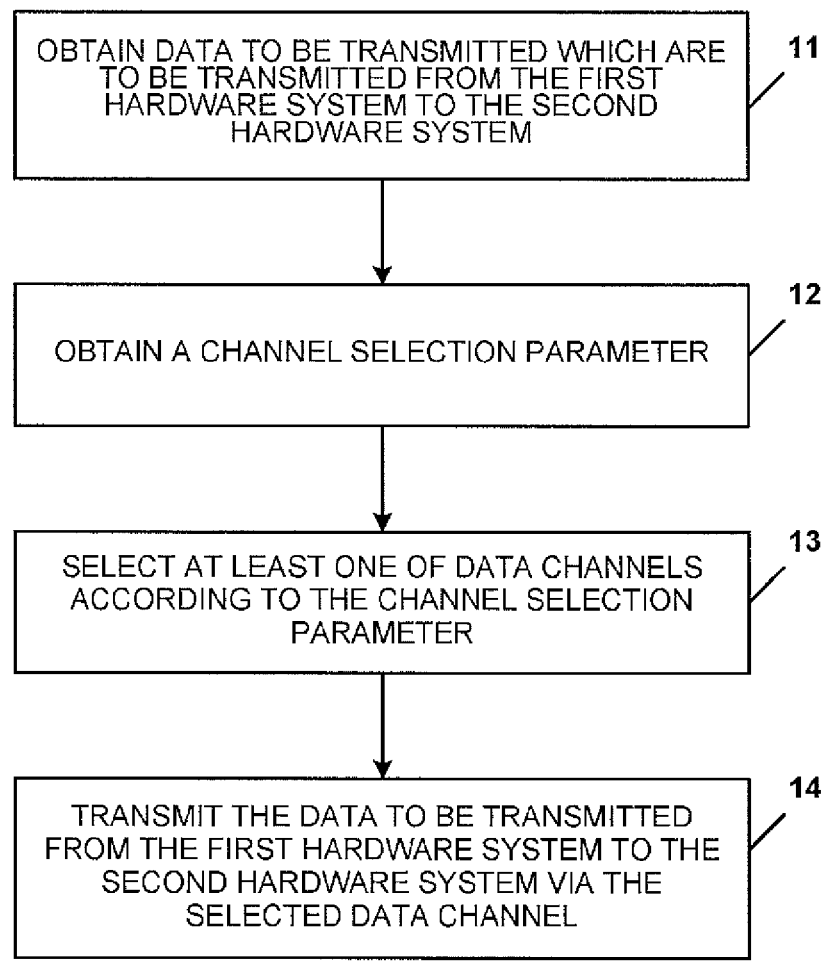
FIG. 1 is a flowchart illustrating a communication method according to an embodiment of the present invention.

In the communication method, the communication apparatus and the electronic device according to embodiments of the present invention, a plurality of communication channels are established between a plurality of sub-systems included in a hybrid architecture system, and a channel may be appropriately selected for data interaction according to actual requirements, which may improve flexibility of the data interaction.

Before embodiments of the present invention are described in detail, an electronic device for use in the embodiments of the present invention will be described firstly, so that one skilled in the art may better understand the embodiments of the present invention.

The embodiments of the present invention may be applied in a hybrid architecture system comprising a first terminal and a second terminal (or a first terminal and a third terminal). The hybrid architecture system may comprise two independent terminal devices, and alternatively may be a portable terminal containing a first terminal and a second terminal (or a first terminal and a third terminal).

For example, the hybrid architecture system may comprise one notebook computer with an independent system and one smart phone, and may also be a notebook computer with a hybrid architecture system.

The first terminal may comprise a first hardware system, such as a slave system based on an X86 architecture or an ARM architecture processor; the second terminal may comprise a second hardware system, such as a main system based on an X86 architecture or a ARM architecture processor.

That is, the first terminal and the second terminal may be based on the same hardware architecture, and may also base on different hardware architectures. In addition, the "main system" and the "slave system" may be used to differentiate two systems depend on importance or priority or processing capability or power consumption (for example, the main system corresponds to a system with high importance, high priority, strong processing capability or large power consumption, while the slave system corresponds to the other system), and may also be used to differentiate two systems only by names but do not indicate importance or priority or processing capability or power consumption of the systems.

Further, the second terminal may comprise the second hardware system having a second operating system, such as a second hardware system with a desktop device operating system (e.g. Windows, Linux or MacOS) installed thereon or with a portable device operating system (e.g. Android, Symbian or iOS) installed thereon. The first terminal may comprise the first hardware system having a first operating system, such as a first hardware system with a desktop device operating system (e.g. Windows, Linux or MacOS) installed thereon or with a portable device operating system (e.g. Android, Symbian or iOS) installed thereon.

That is, the first operating system and the second operating system may be identical or different, as long as they are running in a corresponding hardware system. Preferably, the second terminal comprises the main system based on an X86 architecture processor with a desktop operating system installed thereon; and the first terminal comprises the slave system based on an ARM architecture processor with a portable device operating system installed thereon.

The first terminal has a plurality of first interfaces (communication units), and the second terminal has a corresponding plurality of second interfaces, the first terminal and the second terminal being connected or separated by the corresponding first interface and second interface. Although a plurality of data channels may be formed by connecting the first terminal and the second terminal via the corresponding first interface and second interfaces, two data channels will be taken as an example for subsequent illustration for convenience, which are named as a first data channel and a second data channel respectively. However, it should be understood that there may be more than two data channels.

The first interface and the second interface may be wired interfaces and may also be wireless interfaces, which is not limited herein, as long as the first interface of the first terminal and the second interface of the second terminal can connect and separate the two terminals and can perform data interaction therebetween.

When the first interface and the second interface are wired interfaces, the first interface may specifically be a data bus interface, such as a USB interface, or a UART interface, or a self-defined interface, to connect or separate the two devices. The second interface may also be a corresponding USB interface, UART interface or self-defined interface to connect or separate the two systems. When the first interface and the second interface are wireless interfaces, the two interfaces may be matched Bluetooth interfaces, or infrared interfaces or WiFi interfaces.

Taking a notebook having a hybrid system architecture as an example, the first terminal and the second terminal are two independent systems, and may work independently, or work together by connection. The second terminal may be arranged at a host side with respect to the single-system notebook, has a processing unit, an input unit, a storage unit but does not have a display unit; the first terminal may be arranged at a display screen side with respect to the single-system notebook, and has a processing unit, an input unit, a storage unit and a display unit. When the first terminal and the second terminal are connected and cooperate to work, the two terminals may share parts of hardware units, such as the display unit. Since the display unit is integrated with the first terminal, the display unit is only available to the first terminal when the first terminal and the second terminal are disconnected or wiredly separated; and the display unit may be available to the first terminal and may also be available to the second terminal when the first terminal and the second terminal are connected, i.e., the result/output content of an application (containing the operating system) running in the first terminal and/or the second terminal may be displayed by the display unit.

In the portable terminal with the hybrid system architecture as said above, a device similar to a tablet (PDA) having the slave system is equivalent to the first terminal in the embodiment of the present application, a host device having the main system is equivalent to the second terminal in the embodiment of the present application, and another (or the same) host device having the main system is equivalent to a third terminal in the embodiment of the present application.

A communication method according to an embodiment of the present invention is used in a hybrid architecture system comprising a first terminal and a second terminal. The first terminal comprises a first hardware system, and the second terminal comprises a second hardware system. There are a first data channel and a second data channel between the first hardware system and the second hardware system. As shown in FIG. 1, the communication method may comprise:

Step 11 of obtaining data to be transmitted which are to be transmitted from the first hardware system to the second hardware system;

Step 12 of obtaining a channel selection parameter,

Step 13 of selecting at least one data channel from the first data channel and the second data channel according to the channel selection parameter, and Step 14 of transmitting the data to be transmitted from the first hardware system to the second hardware system via the selected at least one data channel.

In the communication method according to the embodiment of the present invention, a plurality of data channels are established between two hardware systems. During data transmission, a data channel may be selected in real time according to the channel selection parameter, and data transmission may be performed using the selected data channel. With the method according to the embodiment of the present invention, either one data channel or two data channels may be selected according to different requirements, which may improve flexibility of data transmission between the hardware systems.

Figure 2:
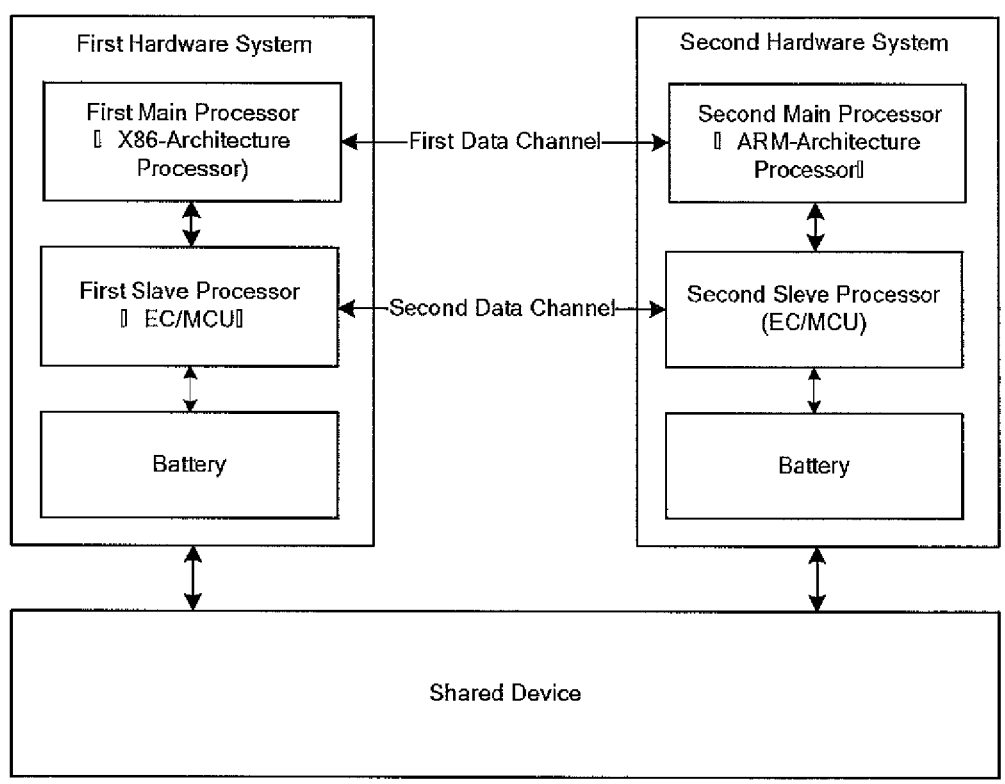
FIG. 2 is a structural diagram illustrating a communication apparatus according to an embodiment of the present invention.

FIG. 2 shows a schematic diagram of a specific application scene of the embodiment of the present invention, in which the whole electronic device hardware comprises three parts: a first hardware system, a second hardware system and a shared device (The shared device is optional, such as a keyboard, a mouse, a display etc. However, whether the shared device exists or not and which of devices is the shared device(s) depend on the actual system).

Each of the first hardware system and the second hardware system may comprise a main processor and a slave processor, in which the main processor in the first hardware system is a processor with an X86 architecture, and the main processor in the second hardware system is a processor with an ARM architecture, while both of the slave processors are ECs (Embedded Controllers)/MCUs (Micro-control Units, also referred to as single chip micro-computers).

There is a first data channel between the main processors as described above, and there is a second data channel between the slave processors. Thus, there are a variety of data transmission channels between the first hardware system and the second hardware system. Taking data transmission from the first hardware system to the second hardware system as an example, the data transmission may comprise the following:

the first main processor transmits data to the second main processor via the first data channel;

the first slave processor transmits data to the second slave processor via the second data channel;

the first main processor transmits data to the first slave processor, and the first slave processor transmits the data to the second slave processor via the second data channel; and the first slave processor transmits data to the first main processor, and the first main processor transmits the data to the second main processor via the first data channel.

Since there are a variety of data transmission channels, the method according to the embodiment of the present invention may select different transmission channels for data transmission depending on requirements, which may improve flexibility of the data transmission.

Taking the above example as an example, since the second data channel depends on the operating state of the EC/MCU and power consumption of the EC/MCU is extremely low generally, the EC/MCU may be controlled to be in the operating state for a long term, so that the second data channel is in the operating state for a long term.

The first data channel depends on the main processor of the device, which has larger power consumption. If the first data channel is in the operating state for a long term, the power consumption of the device will increase. Thus, the first data channel may be in the operating state or the non-operating state according to the hardware states (states of the main processors) of the first hardware system and the second hardware system. When the main processor of the first hardware system or the second hardware system is in a sleeping state, the first data channel is kept in the non-operating state; otherwise, the first data channel is kept in the operating state.

The first data channel and/or the second data channel, when it is in the operating state, can be used for data transmission between the first hardware system and the second hardware system. The first data channel cannot be used for data transmission between the first hardware system and the second hardware system when it is in the non-operating state.

Taking the above structure as an example, it may be found that the power consumption for maintaining the first data channel in the operating state is far larger than that for maintaining the second data channel in the operating state, but a transmission speed of the first data channel may be higher than that of the second data channel.

As previously mentioned, in the specific embodiment of the present invention, the data channel may be selected from the first data channel and the second channel according to the channel selection parameter. With respect to different requirements, the channel selection parameters may be different. The channel selection parameters in the specific embodiment of the present invention may be various, which will be illustrated as follows.

<Approach One>

In Approach One, considering that the transmission speed of the first data channel is higher than that of the second data channel, if the state parameter of the first data channel indicates that the first data channel is in the operating state, the high transmission speed of the first data channel should be sufficiently utilized, and thus the selected data channel must comprise the first data channel.

In this approach, the channel selection parameter is the state parameter of the first data channel. Selecting at least one data channel from the first data channel and the second data channel according to the channel selection parameter comprises selecting at least the first data channel if the state parameter of the first data channel indicates that the first data channel is in the operating state.

According to the above channel selection parameter and the selection strategy, the high-speed data channel in the operating state may be sufficiently utilized without increasing power consumption, which improves efficiency of data transmission.

<Approach Two>

Approach One is to select at least the first data channel for data transmission when the first data channel is in the operating state.

However, when the first data channel is in the non-operating state, a channel selection strategy based on saving power consumption may be used, i.e., when the state parameter of the first data channel indicates that the first data channel is in the non-operating state, the second data channel is selected.

As mentioned previously, the power consumption for maintaining the first data channel in the operating state is far larger than that for maintaining the second data channel in the operating state. Thus, when the first data channel is in the non-operating state, if the purpose for saving power consumption is taken into account, the channel selection parameter is still the state parameter of the first data channel, but the strategy has changed. At this time, selecting at least one data channel from the first data channel and the second data channel according to the channel selection parameter comprises selecting only the second data channel if the state parameter of the first data channel indicates that the first data channel is in the non-operating state.

That is, when the first data channel is in the non-operating state, if the first data channel is to be enabled for data transmission, the power consumption of the system will be increased. However, with the method according to the embodiment of the present invention, when the first data channel is in the non-operating state, the second data channel may be used for data transmission, so as to reduce the power consumption of the system. Especially in a case that the interactions frequently occur, reduction of the power consumption is significantly obvious. Hereinafter, take viewing the battery state as an example for illustration.

When the user needs to view the battery power of the first hardware system periodically (such as once every 20 s) in the second hardware system which is currently running, if the first data channel is used, the main processor of the first hardware system either keeps in a wakeup state all the time, or is woken up once every 20 s, which will increase the power consumption of the system significantly. However, with the method according to the embodiment of the present invention, the main processor of the first hardware system is always kept in the sleeping state, and the power consumption of the system may be reduced by periodically transferring the battery power information from the slave processor of the first hardware system to the slave processor of the second hardware system via the second data channel.

<Approach Three>

In Approach Two, if the first data channel is in the non-operating state, the first data channel is not selected by taking the power consumption into account. However, in some cases that the transmission data amount is large, the time for data transmission, such as user data (e.g. pictures, music, movies etc.) synchronization, will be much long in Approach Two.

In this case, both the transmission speed and the power consumption are taken into account. In this way, the channel selection parameter is data amount of the data to be transmitted, and in the step of selecting at least one data channel from the first data channel and the second data channel according to the channel selection parameter, the first data channel is selected if the data amount of the data to be transmitted is above a preset data amount threshold; otherwise, the second data channel is selected.

In this case, regardless of whether the first data channel is in the operating state, the first data channel is selected as long as the amount of the data to be transmitted is above the threshold, so as to reduce the transmission time. However, when the data amount is small, the second data channel is selected to reduce the power consumption as long as the transmission time is in an acceptable range.

The foregoing description provides three kinds of channel selection parameters and corresponding channel selection strategies according to the embodiments of the present invention. However, it should be understood that the above three kinds of channel selection parameters may also be used in combination. For example, the channel selection parameter comprises the data amount of the data to be transmitted and the operating state of the first data channel. When the data channel is to be selected, the operating state of the first data channel is firstly considered, and the first data channel is directly selected when the first data channel is in the operating state. When the first data channel is in the non-operating state, it is determined whether the data amount of the data to be transmitted is above the threshold. If so, the first data channel is selected; otherwise, the second data channel is selected.

Of course, in the specific embodiment of the present invention, the channel selection parameter may also comprise other parameters, such as attribute of the data to be transmitted. If the data to be transmitted must be transferred immediately at a high speed and the data amount is large, the data to be transmitted cannot be transferred via the second data channel timely, and thus the first data channel is selected regardless of the operating state of the first data channel.

The channel selection parameter and the channel selection strategy according to specific embodiments of the present invention may also be other parameters and strategies, which will not be enumerated one by one herein.

In the communication method as described above, only the case where the data are transmitted from the first hardware system to the second hardware system is illustrated. However, the communication method according to the embodiment of the present invention may also be applied to various scenes, which will be illustrated as follows.

<Scene One>

The data to be transmitted are data read by the first hardware system in real time based on a request from the second hardware system. In this case, the method further comprises, prior to obtaining the data to be transmitted:

receiving, from the second hardware system, a data request for the data to be transmitted.

Now, a case where the battery power is to be viewed will be taken as an example for illustration.

If the user needs to view the battery power of the first hardware system in the second hardware system which is currently running, the second hardware system will send to the first hardware system a data request for the data to be transmitted. Regarding how the data request is transferred to the first hardware system, the data request may be transferred according to the method described previously.

After the first hardware system receives the data request from the second hardware system, the first hardware system may interact with the battery chip for reading the latest battery power information, which may then be returned to the second hardware system using the method according to the embodiment of the present invention.

<Scene Two>

Scene One is an approach for obtaining data in real time. In Scene Two, the data to be transmitted are data pre-cached by the first hardware system in a first cache of the first hardware system, and the first hardware system performs the data transmission based on a request from the second hardware system, i.e., the method further comprises, prior to obtaining the data to be transmitted:

receiving, from the second hardware system, a data request for the data to be transmitted.

Now, a case where the battery power is to be viewed will be taken as an example for illustration.

If the user needs to view the battery power of the first hardware system in the second hardware system which is currently running, the first hardware system will read the battery power periodically, and store in the first cache. When the second hardware system needs to view the battery power of the first hardware system, it will send to the first hardware system a data request for the data to be transmitted. Regarding how the data request is transferred to the first hardware system, the data request may be transferred according to the method described previously.

Upon the first hardware system receives the data request from the second hardware system, the first hardware system may read the latest battery power information from the first cache immediately, which may be returned to the second hardware system using the method of the embodiment of the present invention.

<Scene Three>

In Scene Three, the data to be transmitted are data to be transmitted to the second main processor of the second hardware system. In this scene, the communication method according to the embodiment of the present invention may comprise various processing approaches after the data are transmitted to the second hardware system via the second data channel, each of which will be illustrated as follows.

The first processing approach is for the purpose of saving the power consumption. With this approach, only if the second main processor is in the wakeup state, the data are transmitted to the second main processor.

With this approach, the communication method further comprises:

determining whether the second main processor is in the sleeping state after the data to be transmitted are transmitted from the first hardware system to the second hardware system;

caching the data to be transmitted into a cache of the second hardware system if the second main processor is in the sleeping state; and transmitting the cached data to be transmitted to the second main processor after the second main processor is woken up from the sleeping state.

With the above processing approach, when the second main processor is in the sleeping state, the data are cached. After the second main processor is woken up, the cached data to be transmitted are transmitted to the second main processor. As such, the second main processor will not be frequently woken up. This saves the power consumption, which will be illustrated by an example as follows.

The second hardware system needs to record a battery power consumption profile of the first hardware system within a time period. At this time, the second hardware system may be in the sleeping state. During the sleeping state of the second hardware system, the battery power information of each period transmitted by the first hardware system may be received via the second data channel and cached.

When the second hardware system is woken up, all of the cached battery power information is transmitted to the second main processor. Then, the second main processor may draw the battery power consumption profile of the first hardware system during the sleeping period of the second hardware system according to these data. Since the profile is not required to be drawn by waking up the second main processor each time the data is received, the power consumption may be reduced greatly.

In the above processing approach, the data are not transmitted to the second main processor until the second main processor is woken up. However, this approach is not suitable for a command requiring real-time processing, which will be illustrated by an example as follows.

When the first hardware system transmits to the second hardware system an instruction instructing that a message on the memory usage state shall be returned in 3 seconds, if the slave processor of the second hardware system cannot process the instruction and the second main processor is in the sleeping state, it cannot wait as the first processing approach does at this time because it will affect operations of the first hardware system. Considering this scene, in the communication processing method according to the embodiment of the present invention, the data to be transmitted are data to be transmitted to the second main processor of the second hardware system, and the communication method further comprises:

determining the current state of the second main processor after the data to be transmitted are transmitted from the first hardware system to the second hardware system;

transmitting the data to be transmitted to the second main processor if the second main processor is in an activated state; otherwise, determining whether the data to be transmitted need to be transmitted to the second main processor immediately; and waking up the second main processor and transmitting the data to be transmitted to the second main processor if the data to be transmitted need to be transmitted to the second main processor immediately; otherwise, caching the data to be transmitted into a cache of the second hardware system, and transmitting the cached data to be transmitted to the second main processor when the second main processor is woken up and in the activated state.

Regarding what data need to be transmitted to the second main processor immediately, the user may define it by himself/herself, or may determine it according to other factors, which will not be described in detail here.

In a specific embodiment of the present invention, the data to be transmitted are battery state data or battery state query instruction.

Figure 3:
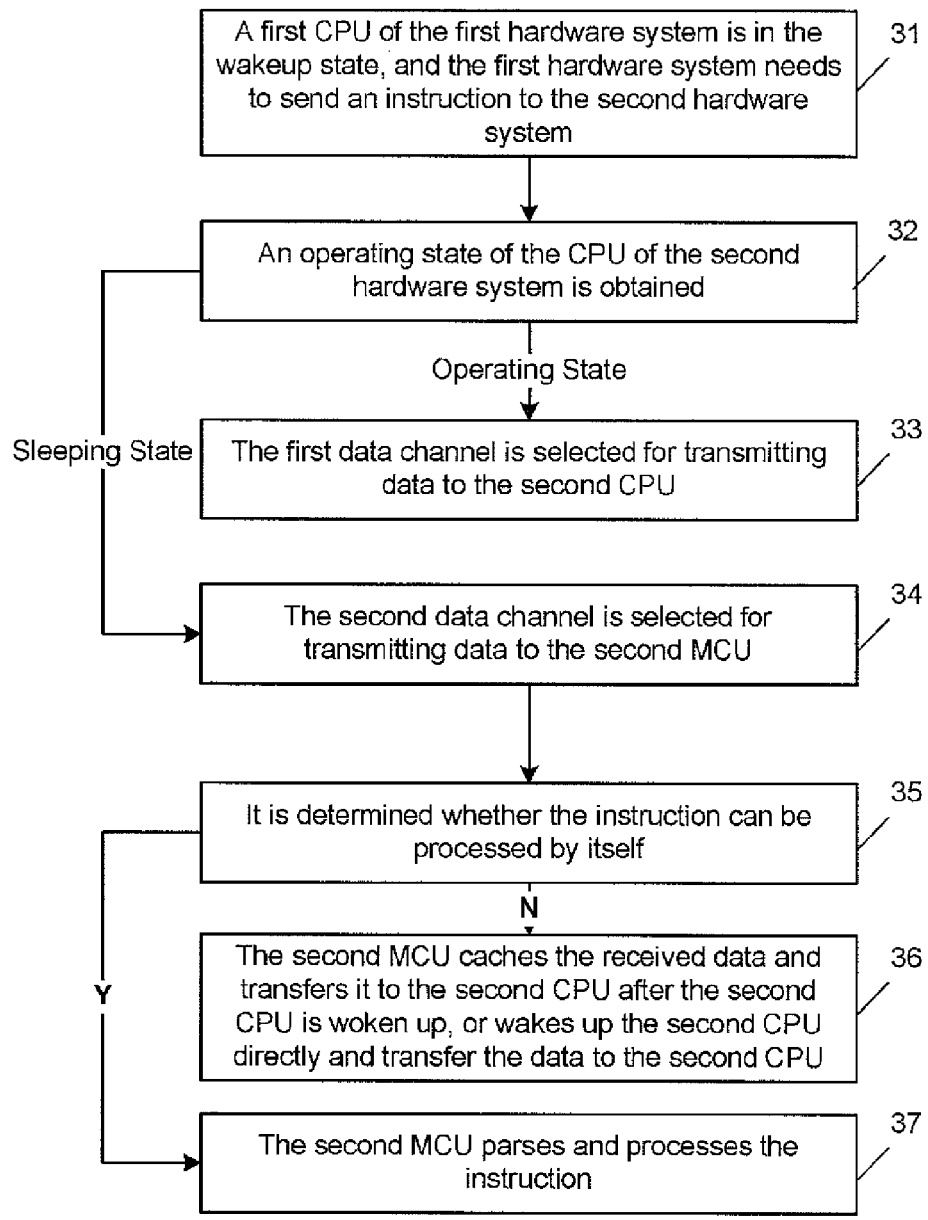
FIG. 3 is a specific flowchart illustrating a communication method according to an embodiment of the present invention.

Hereinafter, instruction transfer processing may be taken as an example for detailed illustration. The instruction transfer processing may comprise two processes: sending by the first hardware system an instruction to the second hardware system; and returning by the second hardware system an instruction response to the first hardware system. The process of sending by the first hardware system the instruction to the second hardware system is shown in FIG. 3, which includes:

Step S31, in which a first CPU of the first hardware system is in the wakeup state, and the first hardware system needs to send an instruction to the second hardware system;

Step S32, in which operating state of a second CPU of the second hardware system is determined;

Step S33, in which the first data channel is selected for transmitting the instruction to the second CPU if it is determined the second CPU of the second hardware system is in the operating state;

Step S34, in which the second data channel is selected for transmission if it is determined the second CPU of the second hardware system is in the sleeping state, i.e., the instruction is transmitted to the second MCU via the channel of the first CPU—the first MCU—the second MCU;

Step S35, in which the second MCU determines whether the instruction can be processed by itself after it receives the instruction; if not, the process goes to Step S36; otherwise, the process goes to Step S37;

Step S36, in which the second MCU caches the instruction and transfers the instruction to the second CPU after the second CPU is woken up, or wakes up the second CPU and transfers data directly to the second CPU; and Step S37, in which the second MCU parses and processes the instruction.

The instruction transfer processing is ended so far.

Regarding an instruction the second MCU cannot process, the instruction is processed by the second CPU after the second CPU is woken up, and is returned to the first CPU via the first data channel. Regarding an instruction the second MCU can process, an instruction response may be returned to the first MCU via the second data channel after the instruction is processed by the second MCU, and then returned to the first CPU by the first MCU.

Regarding data prepared by the second MCU, there are two kinds of data. One is the data transmitted to the MCU system cache before the second CPU enters the sleeping state, such as a power supply system state. The other is the data instantly obtained by the second MCU system, such as information of the battery.

An example is taken for the first kind of data.

The second CPU enters the sleeping state after it sends the power supply state of its own to the second MCU; the second MCU caches it for a query from the first hardware system after it receives the power supply state; when a power supply query instruction is received via the second data channel, the second MCU analyzes the instruction to obtain the requirement of the first hardware system and then reads the cached power supply state, and returns it to the first MCU via the second data channel.

An example is taken for the second kind of data.

When the second MCU receives a battery information query instruction via the second data channel, the second MCU analyzes the instruction to obtain the requirement of the first hardware system, obtains related data from the battery (Smart Battery Protocol) via a private bus, and then returns it to the first MCU via the second data channel, which will be returned to the first CPU by the first MCU.

Hereinafter, an example where the embodiment of the present invention is applied to the battery will be described in detail.

In connection with FIG. 2, EC/MCUs in both the first hardware system and the second hardware system may read the battery information via SMBUS. The first data channel may be an RNDIS data channel, while the second data channel may be a UART data channel. There are also data and event channels between the main processor and the slave processor in each hardware system.

There are two ways for the second hardware system reporting the battery data to the first hardware system.

Figure 4:
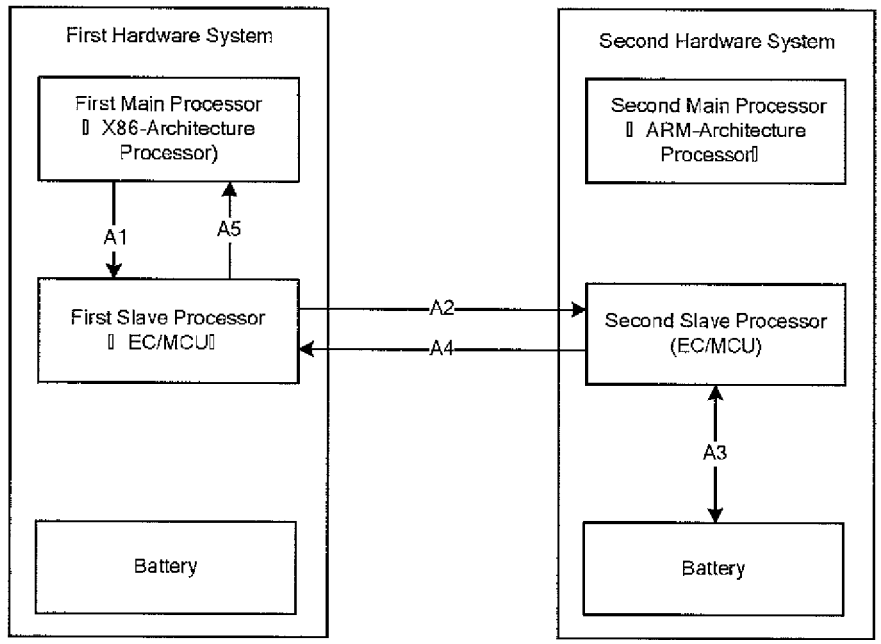
FIGS. 4 and 5 are two diagrams illustrating battery information transfer using a method according to an embodiment of the present invention.

1. The first way is illustrated as shown in FIG. 4. The transfer path for the data/instruction may be divided into: A1 (the first main processor→the first slave processor)+A2 (the first slave processor→the second slave processor)+A3 (the second slave processor→the battery)+A4 (the second slave processor→the first slave processor)+A5 (the first slave processor→the first main processor). In such a way, interaction of the instruction/data is performed via the second data channel.

Figure 5:
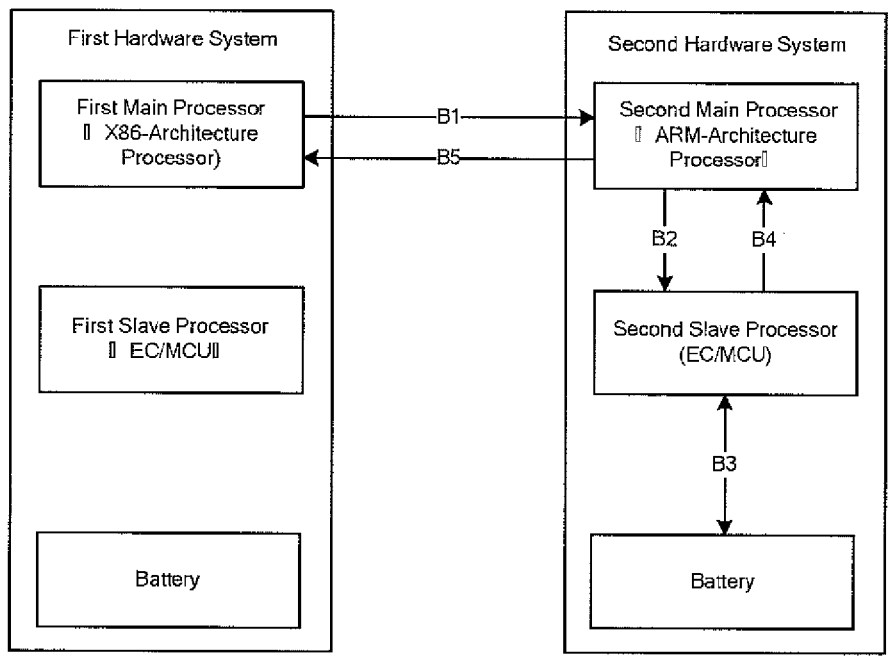

2. The second way is illustrated as shown in FIG. 5. The transfer path for the data/instruction may be divided into: B1 (the first main processor→the second main processor)+B2 (the second main processor→the second slave processor)+B3 (the second slave processor→the battery)+B4 (the second slave processor→the second main processor)+B5 (the second main processor→the first main processor). In such a way, interaction of the instruction/data is performed via the first data channel.

3. The third way may be a combination of the previous two ways. That is, the transfer path for the data/instruction may be divided into: A1 (the first main processor→the first slave processor)+A2 (the first slave processor→the second slave processor)+A3 (the second slave processor→the battery)+B4 (the second slave processor→the second main processor)+B5 (the second main processor→the first main processor). In such a way, interaction of the instruction/data is performed via both the first data channel and the second data channel.

In the specific embodiment of the present invention, the EC/MCU may obtain the battery information in such a way as follows:

Approach One, in which the EC may interact with the battery chip to obtain and return the information in real time upon the EC receives the instruction; or Approach Two, in which the EC may periodically read the battery information and cache the read battery information, and may directly read the information from the cache and return the information upon the EC receives the instruction.

Figure 6:
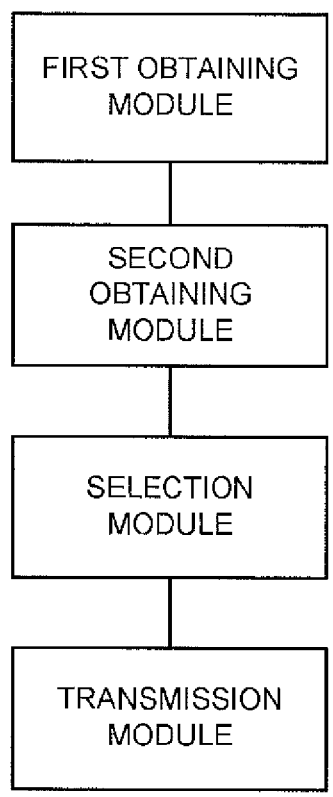
FIG. 6 is a structural diagram illustrating a communication apparatus according to an embodiment of the present invention.

The communication apparatus according to the embodiment of the present invention may be used in a hybrid architecture system comprising a first terminal and a second terminal, the first terminal comprising a first hardware system, the second terminal comprising a second hardware system, there being a first data channel and a second data channel between the first hardware system and the second hardware system. As shown in FIG. 6, the communication apparatus may comprise:

a first obtaining module configured to obtain data to be transmitted which are to be transmitted from the first hardware system to the second hardware system;

a second obtaining module configured to obtain a channel selection parameter, a selection module configured to select at least one data channel from the first data channel and the second data channel according to the channel selection parameter, and a transmission module configured to transmit the data to be transmitted from the first hardware system to the second hardware system via the selected at least one data channel.

The communication apparatus as described above may be applied to such a scene that the second data channel is in an operating state for a long term; the first data channel is in an operating state or a non-operating state according to hardware states of the first hardware system and the second hardware system; the first data channel and/or the second data channel, when it is in the operating state, can be used for transmitting data between the first hardware system and the second hardware system; and the first data channel cannot be used for transmitting data between the first hardware system and the second hardware system when it is in the non-operating state.

In this scene, considering utilizing the transmission speed sufficiently, the channel selection parameter is a state parameter of the first data channel, and the selection module is further configured to select at least the first data channel if the state parameter of the first data channel indicates that the first data channel is in the operating state.

Considering the transmission time, the channel selection parameter is data amount of the data to be transmitted, and the selection module is further configured to select the first data channel if the data amount of the data to be transmitted is above a preset data amount threshold; otherwise, select the second data channel.

In the above communication apparatus, the data to be transmitted are data pre-cached by the first hardware system into a first cache of the first hardware system, and the communication apparatus further comprises:

a reception module configured to receive, from the second hardware system, a data request for the data to be transmitted.

The first obtaining module is further configured to obtain the data to be transmitted upon the reception module receives the request.

When the data to be transmitted are data to be transmitted to a second main processor of the second hardware system, considering saving the power consumption, the communication apparatus further comprises:

a first determination module configured to determine whether the second main processor is in a sleeping state after the data to be transmitted are transmitted from the first hardware system to the second hardware system;

a first caching module configured to cache the data to be transmitted into a cache of the second hardware system if the second main processor is in the sleeping state; and a first transmission module configured to transmit the cached data to be transmitted to the second main processor after the second main processor is woken up from the sleeping state.

When the data to be transmitted are data to be transmitted to the second main processor of the second hardware system, considering processing capability, real-time requirements of the processing and the power consumption, the communication apparatus further comprises:

a second determination module configured to determine the current state of the second main processor after the data to be transmitted are transmitted from the first hardware system to the second hardware system;

a third determination module configured to transmit the data to be transmitted to the second main processor if the second main processor is in an activated state; otherwise, determine whether the data to be transmitted need to be transmitted to the second main processor immediately; and a second transmission module configured to wake up the second main processor and transmit the data to be transmitted to the second main processor if the data to be transmitted need to be transmitted to the second main processor immediately; otherwise, cache the data to be transmitted into a cache of the second hardware system, and transmit the cached data to be transmitted to the second main processor when the second main processor is woken up and in the activated state.

In the communication apparatus according to the embodiment of the present invention, the power consumption for maintaining the first data channel in the operating state is larger than that for maintaining the second data channel in the operating state.

The communication apparatus according to the embodiment of the present invention may be used to query the battery information, where the data to be transmitted are battery state data or a battery state query instruction.

The embodiment of the present invention further provides an electronic device comprising a first terminal and a second terminal, the first terminal comprising a first hardware system, the second terminal comprising a second hardware system, there being a first data channel and a second data channel between the first hardware system and the second hardware system, the electronic device further comprising:

a first obtaining module configured to obtain data to be transmitted which are to be transmitted from the first hardware system to the second hardware system;

a second obtaining module configured to obtain a channel selection parameter, a selection module configured to select at least one data channel from the first data channel and the second data channel according to the channel selection parameter, and a transmission module configured to transmit the data to be transmitted from the first hardware system to the second hardware system via the selected at least one data channel.

In embodiments of the present invention, modules may be implemented by software so as to be executed by various types of processors. For example, one identified executable code module may comprise one or more physical or logic blocks of computer instructions, which may be constructed as e.g. objects, processes or functions. However, the executable codes of the identified module are not necessarily arranged together physically. They may comprise different instructions stored at different positions. When these instructions are connected logically, they constitute a module and may achieve the specified purpose of the module.

Actually, the executable code module may be a single piece of instruction or a plurality of pieces of instructions, and may even be distributed over a plurality of different code segments, distributed in different programs, or even distributed across a plurality of storage devices. Also, operation data may be identified in the module, and may be implemented in any appropriate form and organized in any appropriate type of data structure. The operation data may be collected as a single data set or may be distributed on different positions (included in different storage devices), and at least parts of the operation data may be carried on the system or network as electronic signals.

When the modules may be implemented by software, considering the state of the art for the current hardware process, the skilled in the art may build corresponding hardware circuits to implement corresponding functions of the modules capable of being implemented by software regardless of costs. The hardware circuit may comprise a common VLSI (Very Large Scale Integration) circuit or a gate array and a current semiconductor such as a logic chip, a transistor or other discrete elements. The modules may be implemented by a programmable hardware device such as a field programmable gate array, programmable array logic, programmable logic device etc.

The above descriptions are only related to preferred embodiments of the present invention, and do not limit the present invention at all. Any amendment, equivalent substitution, improvement etc. within spirit and principles of the present invention should fall into the protection scope of the present invention.

I claim:

1. A communication method for use in a hybrid architecture computer system comprising a first terminal and a second terminal, the first terminal comprising a first hardware system having a first operating system, the second terminal comprising a second hardware system having a second operating system, there being a first data channel and a second data channel between the first hardware system and the second hardware system, the communication method comprising:

obtaining data to be transmitted which are to be transmitted from the first hardware system to the second hardware system;

obtaining a channel selection parameter;

selecting at least one data channel from the first data channel and the second data channel according to the channel selection parameter; and transmitting the data to be transmitted from the first hardware system to the second hardware system via the selected at least one data channel, wherein power consumption for maintaining the first channel in the operating state is larger than that for maintaining the second data channel in the operating state, and wherein (i) the channel selection parameter is a state parameter of the first data channel, and selecting at least one data channel from the first data channel and the second data channel according to the channel selection parameter comprises selecting at least the first data channel if the state parameter of the first data channel indicates that the first data channel is in the operating state or (ii) the channel selection parameter is data amount of the data to be transmitted, and selecting at least one data channel from the first data channel and the second data channel according to the channel selection parameter comprises selecting the first data channel if the data amount of the data to be transmitted is above a preset data amount threshold; otherwise, selecting the second data channel.

2. The communication method according to claim 1, wherein the second data channel is in an operating state for a long term; the first data channel is in an operating state or a non-operating state according to hardware states of the first hardware system and the second hardware system; the first data channel and/or the second data channel, when it is in the operating state, can be used for transmitting data between the first hardware system and the second hardware system; and the first data channel cannot be used for transmitting data between the first hardware system and the second hardware system when it is in the non-operating state.

3. The communication method according to claim 1, wherein the data to be transmitted are data pre-cached by the first hardware system into a first cache of the first hardware system, and the method further comprises, prior to obtaining the data to be transmitted: receiving, from the second hardware system, a data request for the data to be transmitted.

4. The communication method according to claim 1, wherein the data to be transmitted are data to be transmitted to a second main processor of the second hardware system, and the communication method further comprises:

determining whether the second main processor is in a sleeping state after the data to be transmitted are transmitted from the first hardware system to the second hardware system;

caching the data to be transmitted into a cache of the second hardware system if the second main processor is in the sleeping state; and transmitting the cached data to be transmitted to the second main processor after the second main processor is woken up from the sleeping state.

5. The communication method according to claim 1, wherein the data to be transmitted are data to be transmitted to the second main processor of the second hardware system, and the communication method further comprises:

determining the current state of the second main processor after the data to be transmitted are transmitted from the first hardware system to the second hardware system;

transmitting the data to be transmitted to the second main processor if the second main processor is in an activated state; otherwise, determining whether the data to be transmitted need to be transmitted to the second main processor immediately; and waking up the second main processor and transmitting the data to be transmitted to the second main processor if the data to be transmitted need to be transmitted to the second main processor immediately; otherwise, caching the data to be transmitted into the cache of the second hardware system, and transmitting the cached data to be transmitted to the second main processor when the second main processor is woken up and in the activated state.

6. The communication method according to claim 1, wherein the data to be transmitted are battery state data or a battery state query instruction.

7. A communication apparatus for use in a hybrid architecture computer system comprising a first terminal and a second terminal, the first terminal comprising a first hardware system having a first operating system, the second terminal comprising a second hardware system having a second operating system, there being a first data channel and a second data channel between the first hardware system and the second hardware system, the communication apparatus comprising:

a first obtaining module configured to obtain data to be transmitted which are to be transmitted from the first hardware system to the second hardware system;

a second obtaining module configured to obtain a channel selection parameter;

a selection module configured to select at least one data channel from the first data channel and the second data channel according to the channel selection parameter; and a transmission module configured to transmit the data to be transmitted from the first hardware system to the second hardware system via the selected at least one data channel, wherein power consumption for maintaining the first data channel in the operating state is larger than that for maintaining the second data channel in the operating state, and wherein (i) the channel selection parameter is a state parameter of the first data channel, and the selection module is further configured to select at least the first data channel if the state parameter of the first data channel indicates that the first data channel is in the operating state or (ii) the channel selection parameter is data amount of the data to be transmitted, and the selection module is further configured to: select the first data channel if the data amount of the data to be transmitted is above a preset data amount threshold; otherwise, select the second data channel.

8. The communication apparatus according to claim 7, wherein the second data channel is in an operating state for a long term; the first data channel is in an operating state or a non-operating state according to hardware states of the first hardware system and the second hardware system; the first data channel and/or the second data channel, when it is in the operating state, can be used for transmitting data between the first hardware system and the second hardware system; and the first data channel cannot be used for transmitting data between the first hardware system and the second hardware system when it is in the non-operating state.

9. The communication apparatus according to claim 7, wherein the data to be transmitted are data pre-cached by the first hardware system into a first cache of the first hardware system, and the communication apparatus further comprises:
   a reception module configured to receive, from the second hardware system, a data request for the data to be transmitted; and
   wherein the first obtaining module is further configured to obtain the data to be transmitted upon the reception module receives the request.

10. The communication apparatus according to claim 7, wherein the data to be transmitted are data to be transmitted to a second main processor of the second hardware system, and the communication apparatus further comprises:
   a first determination module configured to determine whether the second main processor is in a sleeping state after the data to be transmitted are transmitted from the first hardware system to the second hardware system;
   a first caching module configured to cache the data to be transmitted into a cache of the second hardware system if the second main processor is in the sleeping state; and
   a first transmission module configured to transmit the cached data to be transmitted to the second main processor after the second main processor is woken up from the sleeping state.

11. The communication apparatus according to claim 7, wherein the data to be transmitted are data to be transmitted to the second main processor of the second hardware system, and the communication apparatus further comprises:
   a second determination module configured to determine the current state of the second main processor after the data to be transmitted are transmitted from the first hardware system to the second hardware system;
   a third determination module configured to transmit the data to be transmitted to the second main processor if the second main processor is in an activated state; otherwise, determine whether the data to be transmitted need to be transmitted to the second main processor immediately; and
   a second transmission module configured to wake up the second main processor and transmit the data to be transmitted to the second main processor if the data to be transmitted need to be transmitted to the second main processor immediately; otherwise, cache the data to be transmitted into a cache of the second hardware system, and transmit the cached data to be transmitted to the second main processor when the second main processor is woken up and in the activated state.

12. The communication apparatus according to claim 7, wherein the data to be transmitted are battery state data or a battery state query instruction.

13. An electronic device comprising a first terminal and a second terminal, the first terminal comprising a first hardware system having a first operating system, the second terminal comprising a second hardware system having a second operating system, there being a first data channel and a second data channel between the first hardware system and the second hardware system, the electronic device further comprising:
   a first obtaining module configured to obtain data to be transmitted which are to be transmitted from the first hardware system to the second hardware system;
   a second obtaining module configured to obtain a channel selection parameter;
   a selection module configured to select at least one data channel from the first data channel and the second data channel according to the channel selection parameter; and
   a transmission module configured to transmit the data to be transmitted from the first hardware system to the second hardware system via the selected at least one data channel,
   wherein power consumption for maintaining the first data channel in the operating state is larger than that for maintaining the second data channel in the operating state, and
   wherein (i) the channel selection parameter is a state parameter of the first data channel, and the selection module is further configured to select at least the first data channel if the state parameter of the first data channel indicates that the first data channel is in the operating state or (ii) the channel selection parameter is data amount of the data to be transmitted, and the selection module is further configured to: select the first data channel if the data amount of the data to be transmitted is above a preset data amount threshold; otherwise, select the second data channel.

* * * * *